United States Patent
Kojima et al.

(10) Patent No.: US 11,518,704 B2
(45) Date of Patent: Dec. 6, 2022

(54) FABRICATION METHOD FOR POROUS GLASS BASE MATERIAL FOR OPTICAL FIBER

(71) Applicant: Shin-Etsu Chemical Co., Ltd., Tokyo (JP)

(72) Inventors: Hiroki Kojima, Chiba (JP); Yuichi Matsunaga, Ibaraki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 44 days.

(21) Appl. No.: 16/785,651

(22) Filed: Feb. 10, 2020

(65) Prior Publication Data

US 2020/0255320 A1 Aug. 13, 2020

(30) Foreign Application Priority Data

Feb. 12, 2019 (JP) .............................. JP2019-022339

(51) Int. Cl.
*C03B 37/014* (2006.01)

(52) U.S. Cl.
CPC ...... *C03B 37/0142* (2013.01); *C03B 2207/06* (2013.01); *C03B 2207/20* (2013.01)

(58) Field of Classification Search
None
See application file for complete search history.

(56) References Cited

U.S. PATENT DOCUMENTS

| | | | | |
|---|---|---|---|---|
| 4,062,665 A | * | 12/1977 | Izawa | .................. C03B 37/014 |
| | | | | 65/391 |
| 2001/0047666 A1 | | 12/2001 | Sugiyama | |
| 2004/0055339 A1 | | 3/2004 | Ishihara | |
| 2005/0109066 A1 | * | 5/2005 | Dabby | ................ C03B 37/0142 |
| | | | | 65/531 |

(Continued)

FOREIGN PATENT DOCUMENTS

| | | |
|---|---|---|
| JP | H0881234 A | 3/1996 |
| JP | H10259034 A | 9/1998 |
| JP | H11240732 A | 9/1999 |

(Continued)

OTHER PUBLICATIONS

KR 100812468 B1 (Yang et al) Mar. 10, 2008 (English language machine translation), [online] [retrieved Jun. 16, 2021], Retrieved from: ip.com (Year: 2008).*

(Continued)

*Primary Examiner* — Erin Snelting

(57) ABSTRACT

To provide a fabrication method for a porous glass base material for optical fiber, the method including performing deposition of glass fine particles generated by using a burner for glass fine particle synthesis to form a porous glass base material, and heating this porous glass base material to be transformed into transparent glass to obtain a glass base material hardly containing any air bubbles. Provided is a fabrication method for a porous glass base material for optical fiber by depositing glass fine particles, which is generated in flame formed by ejecting a glass raw material gas and a combustible gas from a burner, on a rotating (Continued)

starting material, in which the burner continuously ejects inert gas for at least a predetermined period immediately after the end of the deposition of the glass fine particles.

11 Claims, 4 Drawing Sheets

(56) References Cited

U.S. PATENT DOCUMENTS

2010/0323311 A1 12/2010 Yoshida
2014/0305168 A1* 10/2014 Ishihara ............ C03B 37/01413
65/379

FOREIGN PATENT DOCUMENTS

| JP | 2000211929 A | * | 8/2000 | ....... C03B 37/01413 |
| JP | 2010215415 A | | 9/2010 | |
| JP | 2011230937 A | | 11/2011 | |
| JP | 2012041227 A | | 3/2012 | |
| JP | 2013234078 A | | 11/2013 | |
| KR | 100812468 B1 | * | 3/2008 | |
| WO | 02102724 A1 | | 12/2002 | |

OTHER PUBLICATIONS

JP 2000-211929 A (Kawaguchi et al.) Aug. 2, 2000 (English language machine translation), [online] [retrieved Dec. 8, 2021], Retrieved from: Espacenet. (Year: 2000).*

Extended European Search Report for European Patent Application No. 20156839.1, issued by the European Patent Office dated Jun. 29, 2020.

Office Action issued for counterpart Japanese Application No. 2019-022339, issued by the Japan Patent Office dated Dec. 6, 2021 (drafted on Nov. 22, 2021).

Office Action issued for counterpart Japanese Application No. 2019-022339, issued by the Japan Patent Office dated May 18, 2022 (drafted on May 13, 2022).

* cited by examiner

FABRICATION METHOD FOR POROUS GLASS BASE MATERIAL FOR OPTICAL FIBER

The contents of the following Japanese patent application are incorporated herein by reference:
No. 2019-22339 filed on Feb. 12, 2019.

BACKGROUND

1. Technical Field

The present invention relates to a fabrication method for a porous glass base material for optical fiber.

2. Related Art

For example, a method of forming a porous glass base material for optical fiber has been proposed in which glass fine particles generated by ejecting a glass raw material gas and a combustible gas from a burner are deposited on a rotating starting material (see PTL 1).

During the deposition of the glass fine particles, the glass fine particles that have not been deposited as the porous glass base material and not adhered among the glass fine particles generated by the burner for synthesis of the glass fine particles may adhere to a reaction chamber inner wall surface or the like to become fine particle aggregates and remain in a reaction container. The aggregates may intrude into the synthesis burner before the start of the subsequent fabrication (deposition) in some cases. When clogging of an ejection port of the synthesis burner occurs, or when the fine particle aggregates intruding into the synthesis burner are ejected during the base material fabrication in the subsequent batch and mixed into the porous glass base material in deposition, this becomes a cause of air bubbles generated in the glass base material obtained by heating this base material to be transformed into transparent glass.

In view of the above, a technology has been proposed in which before the start of the fabrication of the porous glass base material, an inert gas is caused to flow through the burner for synthesis of the glass fine particle at a linear speed equal to or higher than 25 m/s, such that the aggregates of the glass fine particles intruding into the burner are removed in advance (see PTL 2).

On the other hand, to increase a deposition efficiency of the glass fine particles generated by the burner on the porous glass base material and reduce the glass fine particles that have not adhered, a burner for synthesis of glass fine particles has been proposed in which small-diameter gas ejection ports are arranged so as to surround a raw material gas ejection port disposed in a center of the synthesis burner, and a combustion supporting gas is ejected from the small-diameter gas ejection ports (see PTL 3).

PTL 1 Japanese Unexamined Patent Application Publication No. 2013-234078
PTL 2 Japanese Unexamined Patent Application Publication No. 11-240732
PTL 3 Japanese Unexamined Patent Application Publication No. 2010-215415

After fabrication of a porous glass base material, when an aggregate of residual glass fine particles in a reaction chamber is mixed into a burner to adhere, this mixed aggregate of the glass fine particles may be ejected from the burner in a subsequent fabrication batch to adhere to the porous glass base material in fabrication in some cases. There is a possibility that air bubbles may be generated when this porous glass base material is sintered to be transformed into transparent glass.

In particular, in the case of a burner including small-diameter gas ejection ports as illustrated in PTL 3, it is not easy to suck out the aggregate of the glass fine particles mixed into the small-diameter gas ejection ports to adhere by a vacuum cleaner or the like. In addition, when an inert gas at 25 m/s or higher is caused to flow through the burner before the start of synthesis of the glass fine particles as illustrated in PTL 2, an issue occurs that the small-diameter gas ejection ports are affected by vibration due to a gas pressure or a gas flow or the like and is likely to be damaged.

In view of these issues, the present invention is aimed at providing a fabrication method for a porous glass base material for optical fiber in which glass fine particles generated by using a burner for synthesis of glass fine particles are deposited to form a porous glass base material, and this porous glass base material is heated to be transformed into transparent glass to obtain a glass base material hardly containing any air bubbles.

SUMMARY

The present invention has been made in view of the above-described circumstances, and according to an aspect of the present invention, there is provided a fabrication method for a porous glass base material for optical fiber by depositing glass fine particles, which is generated in flame formed by ejecting a glass raw material gas and a combustible gas from a burner, on a rotating starting material, in which the burner continuously ejects inert gas for at least a predetermined period immediately after the end of the deposition of the glass fine particles. EFFECT OF THE INVENTION In accordance with the fabrication method for the porous glass base material for optical fiber according to an aspect of the present invention, the inert gas is caused to continuously flow through all ejection ports of respective burners for at least a predetermined period immediately after the end of the fabrication by pulling out the porous glass base material so that intrusion and adherence of an aggregate of residual glass fine particles in the synthesis burner can be avoided, the glass base material hardly containing any air bubbles for optical fiber can be obtained in a subsequent fabrication batch.

BRIEF DESCRIPTION OF THE DRAWINGS

FIG. 4 is a piping configuration diagram in an upstream of a burner port that ejects a raw material gas or the like.

DESCRIPTION OF EXEMPLARY EMBODIMENTS

Figure 1:
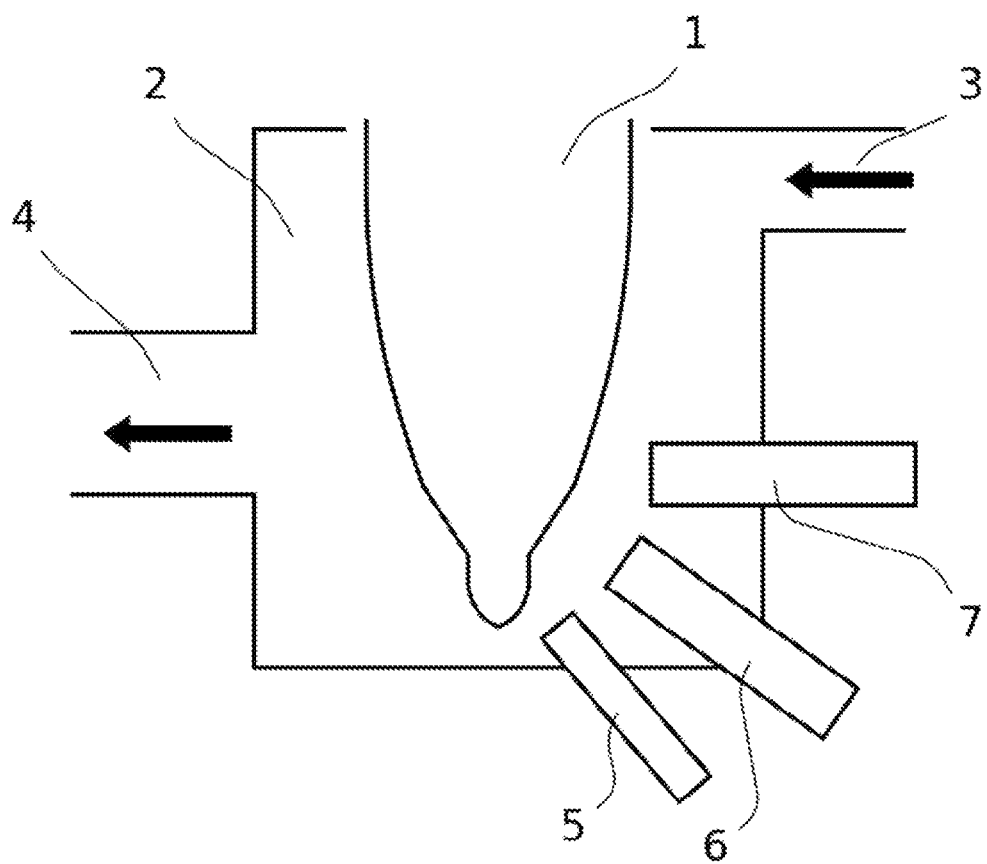
FIG. 1 is a schematic diagram illustrating an outline of a fabrication apparatus for a porous glass base material based on a VAD method.

FIG. 1 is a schematic diagram illustrating an outline of a fabrication apparatus for a porous glass base material for optical fiber based on a VAD method used in the present embodiment.

A porous glass base material 1 is enclosed in a deposit chamber 2 of a reaction container to avoid mixing and also configured to avoid splash of glass fine particles or the like generated during a fabrication process to the outside of a system. An air supply opening 3 and an exhaust opening 4 are disposed in the reaction container, and the reaction container includes a core deposition burner 5, a first clad deposition burner 6 that forms a clad portion on a core side, and a second clad deposition burner 7 that forms a clad portion on a surface side.

A starting material (not illustrated) is inserted into the deposit chamber 2 from the above. The core deposition burner 5 is arranged so as to face a distal end of this starting material, and the first clad deposition burner 6 and the second clad deposition burner 7 are arranged so as to face a side surface of the starting material, at predetermined angles with respect to a pull-out axis of the starting material.

Clean air, for example, is supplied from the air supply opening 3 of the reaction container. Thus, an environment for fabricating the porous glass base material 1 is normally maintained. The glass fine particles that have been synthesized but have not adhered to the porous glass base material are discharged to the outside of the deposit chamber 2 from the exhaust opening 4 together with a part of the supplied air. The discharged glass fine particles are captured outside the reaction container, and scattering of the glass fine particles to an ambient surrounding is avoided.

Each of these burners is generally made of quartz glass. A raw material gas ejection port is disposed in a center part of the burner, and a seal gas ejection port is disposed on a concentric outer side of this. In addition to a raw material gas of the glass fine particles, Ar and $O_2$ are ejected from the raw material gas ejection port. It is noted that these raw material gases will be hereinafter collectively and merely referred to as a raw material gas.

For example, a concentric quadruple burner is adopted as the core deposition burner 5, and a raw material gas (for example, $SiCl_4$, $O_2$), a combustible gas (for example, $H_2$), a combustion supporting gas (for example, $O_2$), and a seal gas (for example, $N_2$) are supplied. A multi-nozzle burner as illustrated in FIG. 2 is adopted as the first clad deposition burner 6 and the second clad deposition burner 7.

Figure 2:
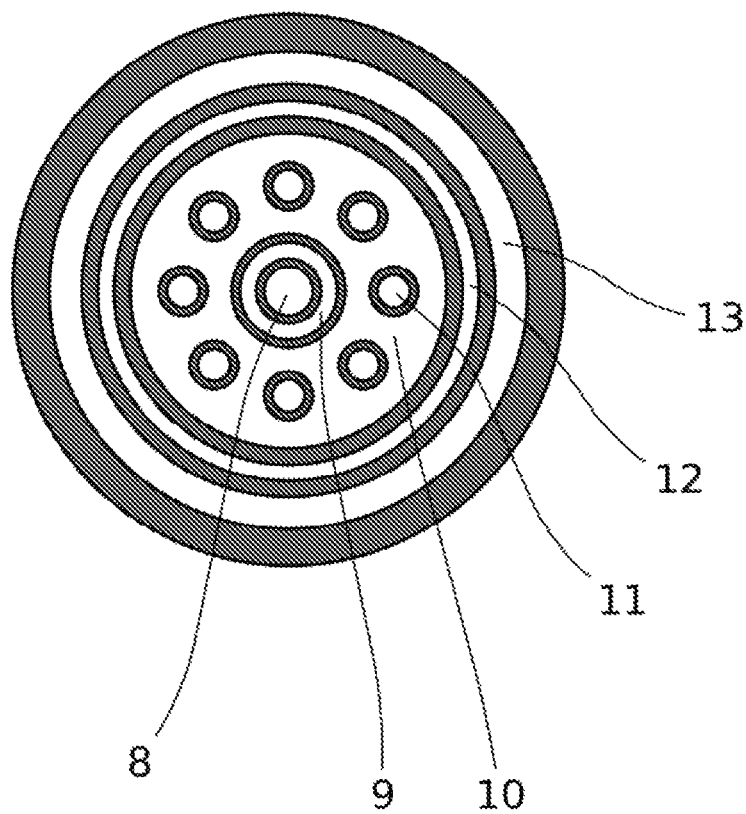
FIG. 2 is a drawing illustrating a configuration of a gas ejection port of a multi-nozzle burner.

FIG. 2 illustrates a gas ejection port of the multi-nozzle burner, and the burner includes a raw material gas ejection port 8 that is disposed in a center part and arranged to eject a raw material gas (for example, $SiCl_4$, $O_2$), a first seal gas ejection port 9 that is circularly disposed on a concentric outer side of the raw material gas ejection port 8 and arranged to eject a seal gas (for example, $N_2$), a combustible gas ejection port 10 that is circularly disposed on a concentric outer side of the first seal gas ejection port 9 and arranged to eject a combustible gas (for example, $H_2$), a plurality of small-diameter combustion supporting gas ejection ports 11 that are disposed in the combustible gas ejection port 10 so as to surround the first seal gas ejection port 9 and arranged to eject a combustion supporting gas (for example, $O_2$), a second seal gas ejection port 12 that is circularly disposed on a concentric outer side of the combustible gas ejection port 10 and arranged to eject a seal gas, and a combustion supporting gas ejection port 13 that is circularly disposed on a concentric outer side of the second seal gas ejection port 12 and arranged to eject a combustion supporting gas.

The porous glass base material 1 grows downward while the glass fine particles formed in burner flame adhere to be deposited on a suspended seed rod (starting material) that is held at a lower end of a shaft in an upper portion (not illustrated). The shaft is arranged to be capable of rotating about a vertical rotational axis to elevate up and down. While the porous glass base material 1 is caused to rotate about a vertical central axis, the shaft is pulled out along with the deposition growth of the glass fine particles at a lower end of the porous glass base material 1, and the deposition continues until the base material reaches a target length.

Each of the core deposition burner 5, the first clad deposition burner 6, and the second clad deposition burner 7 synthesizes the glass fine particles by blowing the raw material gas such as silicon tetrachloride or octamethylcyclotetrasiloxane serving as a glass raw material into oxyhydrogen flame.

A core portion in the porous glass base material 1 eventually turns into a core of optical fiber. The core deposition burner 5 forms the core portion while germanium tetrachloride or the like is added to the raw material gas as a raw material of germanium oxide serving as a dopant for increasing a refractive index.

The first clad deposition burner 6 forms a part of the clad portion by depositing the synthesized glass fine particles on a side surface of the core portion deposited by the core deposition burner 5. The second clad deposition burner 7 forms the porous glass base material 1 by further depositing the glass fine particles on top of the clad portion. The thus fabricated porous glass base material 1 turns into a transparent glass base material by being subjected to dehydration and sintering in a heating furnace in post-process.

Once the growth reaches the predetermined length, the porous glass base material 1 is pulled out upward, and the fabrication is ended. A part of the glass fine particles that have been synthesized but have not adhered to the porous glass base material 1 remains in the reaction container 2 by adhering to an inner wall of the deposit chamber 2 or the like without being discharged from the exhaust opening 4 to the outside. For this reason, to avoid intrusion of the residual glass fine particles into the synthesis burner, an inert gas is caused to continuously flow through all the ejection ports of the respective burners for at least a predetermined period immediately after the end of the fabrication, for example, approximately several minutes. Thus, the intrusion and adhesion of a residual glass fine particle aggregate in the burner can be avoided. In this case, the burner preferably continuously ejects the inert gas for a period from the end of the deposition of the glass fine particles to the start of the subsequent deposition.

According to the present embodiment, it is characterized that the burner continuously ejects the inert gas for the period from the end of the deposition of the glass fine particles to the start of the subsequent fabrication (deposition), but a linear speed Ns of the gas ejected from the gas ejection port of the burner may be more than 0.5 m/s and less than 25 m/s, more preferably, equal to or more than 1.0 m/s and equal to or less than 15 m/s. It is noted that when the gas linear speed is equal to or less than 0.5 m/s, the mixing of the glass fine particles into the burner is not sufficiently suppressed. On the other hand, when the linear speed exceeds 25 m/s, small-diameter ports of the burner may be damaged in some cases. Furthermore, immediately after the fabrication of the glass base material, the porous glass base material immediately after the fabrication exists on an extended line of a gas flow ejected from the burner. When the gas flow at a low temperature and a high linear speed collides with this, the porous base material is rapidly cooled and may crack in some cases. Thus, by managing the gas linear speed within the above-described range, unintended mixing of the glass fine particle aggregate into the burner can be avoided while the damage of the burner or the cracking of the porous glass base material by the inert gas ejection is avoided.

Figure 3:
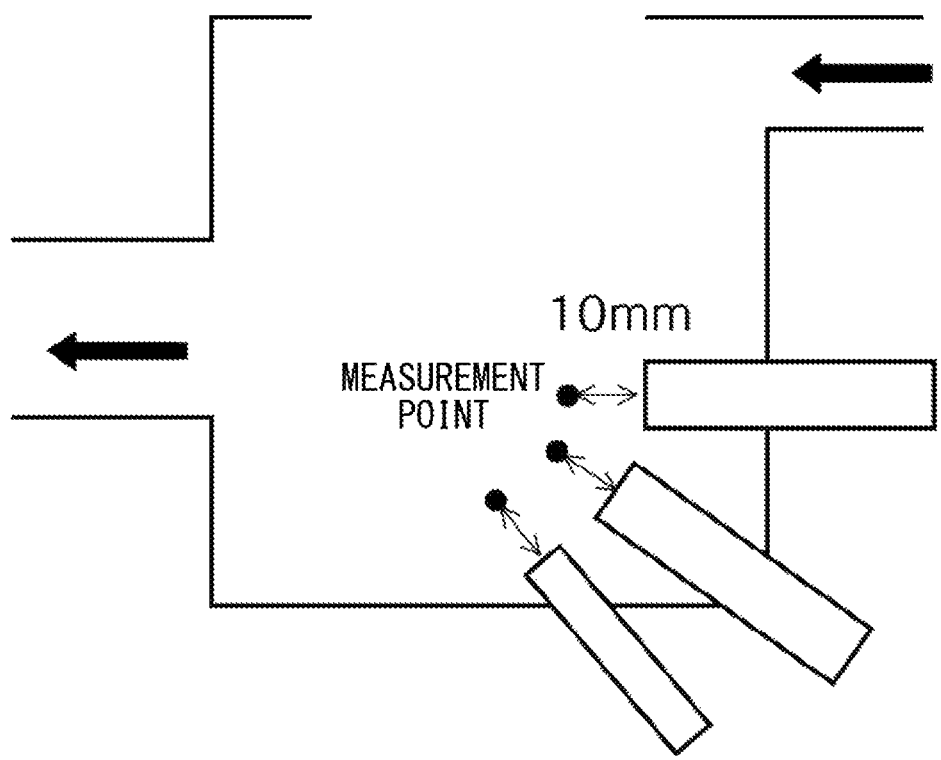
FIG. 3 is a drawing illustrating a linear speed measurement position of a gas ejected from a burner.

It is noted that the linear speed Ns of the gas is a value measured at a position 10 mm away from an opening end surface of the burner, and can be measured using a hot wire anemometer. FIG. 3 illustrates positions where the gas linear speed is measured.

With regard to the introduction of the inert gas into the port from which the glass raw material gas is ejected, a part or all of the inert gas may be introduced from a further upstream of a mass flow controller that adjusts the flow rate of the glass raw material gas in an upstream of the port. As specific means for causing the inert gas to flow into the burner, a method of causing the pressurized inert gas to flow from a mid-course of the upstream gas piping that is joined to each of the ejection ports of the burner, and adjusting the flow rate by a rotameter or the like is exemplified.

The linear speed may also be appropriately changed within the above-described range without being regularly kept constant. For example, the linear speed may also be gradually increased. As an alternative configuration, the linear speed may also be changed in accordance with a size or amount of the fine particle aggregate remaining in the reaction container. After the end of the fabrication, a large amount of the fine particle aggregate adhere to a reaction container wall. Since the fine particle aggregate having a large size is likely to float in a case where this is removed using a vacuum cleaner or the like, intrusion of such an aggregate may also be effectively suppressed by increasing the linear speed. On the other hand, after the fine particles adhering to the reaction container wall are removed, hardly any fine particles floating in the reaction container exist, and since the size of the fine particles is small even if the fine particles exist, the linear speed may also be slowed.

A type of the inert gas which does not affect the glass deposition burner or the mid-course piping and that does not contain a material serving as a factor for increasing transmission loss of optical fiber created from the obtained porous glass base material is preferable. For example, helium, argon, and nitrogen are exemplified.

Figure 4:
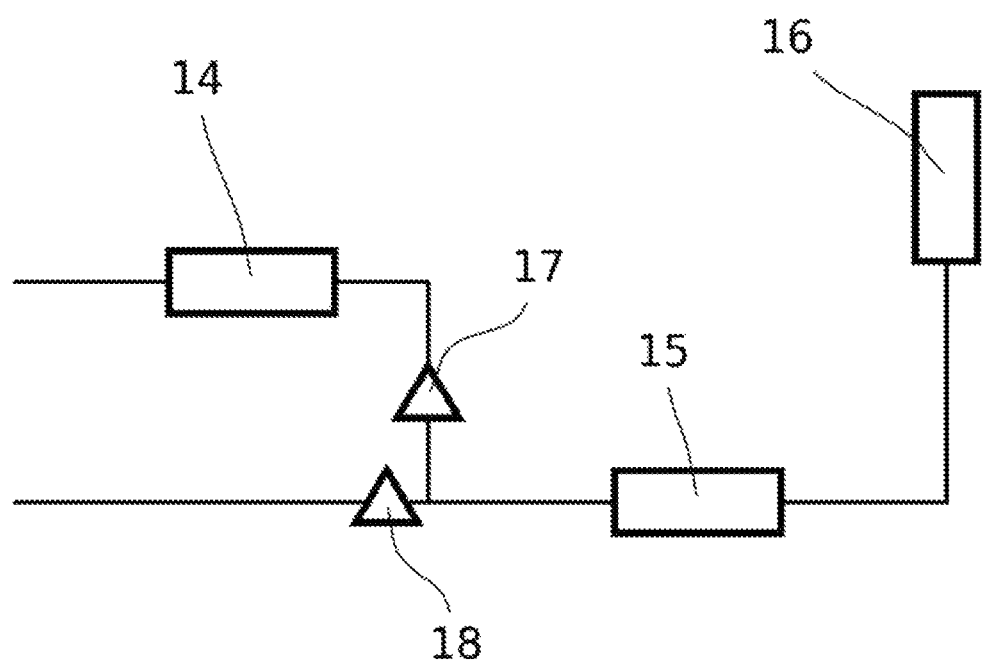

FIG. 4 is a flow diagram of the upstream piping of the raw material gas ejection port 8 of the burner. During the fabrication of the porous glass base material, the raw material gas is supplied from a raw material gas supply valve 18 to be supplied to a burner 16 via a mass flow controller 15. The mass flow controller 15 is heated and kept at 120° C., and condensation of the raw material gas is avoided in the piping.

For the period from the end of the deposition of the glass fine particles to the start of the subsequent fabrication (deposition), with regard to the supply of the inert gas to the mass flow controller 15, the inert gas passes through an inert gas flow rate controller 14 and an inert gas supply valve 17 to be supplied to the mass flow controller 15. The mass flow controller includes therein a narrow duct flow path for flow rate measurement and the like. When the glass raw material gas remains and condenses there, this may become a factor for corrosion and failure. However, the corrosion and failure can be avoided by casing the inert gas to continuously flow.

Furthermore, in a case where silicon tetrachloride, germanium tetrachloride, and the like are used as the glass raw material gases, the raw material gases are heated to a retention temperature of 100 to 120° C., for example, and supplied such that these raw material gases are not to condense in the mid-course of the flow path. In view of the above, the inert gas flowing through the mass flow controller for the raw material gas may be introduced after being preheated so as to have a temperature higher than a boiling point of the glass raw material gas in advance. With the above-described configuration, it is possible to avoid an abrupt temperature change that occurs when the low temperature inert gas at the high flow rate is introduced. Load caused by the temperature change onto a delicate sensor or heater of the mass flow controller is alleviated, and a probability of the failure is reduced.

As an alternative configuration, in a case where the inert gas having a low temperature, for example, the inert gas having a temperature equal to or lower than 100° C. corresponding to the retention temperature of the mass flow controller is caused to flow into these mass flow controllers, when the flowing is performed by adjusting the flow rate to be equal to or lower than 10% of a flow rate range of the mass flow controller, an effect for avoiding the failure of the mass flow controller can be attained. In this case, the linear speed at a burner outlet may also be controlled by introducing an additional inert gas from a downstream of the mass flow controller, or increasing the flow rate of the inert gas ejected from another port (port for ejecting a combustible gas, a combustion supporting gas, or a seal gas) of the burner.

It is noted that the port having the large cross-sectional area of the multi-nozzle burner may also be set to have a higher linear speed to suppress the intrusion of the large fine particle aggregate, and the port having the small cross-sectional area may also be set to have a lower linear speed. In particular, since nozzle ducts of the small-diameter gas ports are narrow, the nozzle ducts are likely to be damaged when the gas at the high flow rate is caused to flow. Therefore, adjustment is preferably performed such that the linear speed is set not to be excessively high.

Example 1

Ten pieces of porous glass base materials were continuously fabricated using the fabrication apparatus illustrated in FIG. 1.

After the end of the fabrication of the porous glass base materials 1, $N_2$ was caused to flow into all of three burners so as to set linear speeds illustrated in Table 1 which will be illustrated below. In the upstream gas piping of the raw material gas ejection port, the raw material gas supply valve 18 was closed, and the inert gas supply valve 17 was opened. $N_2$ serving as the inert gas having the flow rate adjusted by the inert gas flow rate controller 14 flows through the fully open mass flow controller 15 into the burner 16. $N_2$ supplied to a raw material gas line is 30° C. in the inert gas flow rate controller 14. The mass flow controller 15 on the other hand is kept at 120° C. to avoid condensation of the raw material gas. Thus, when a large amount of the inert gas at the low temperature is caused to flow into the mass flow controller 15 kept at the high temperature, this becomes a cause of the damage or failure of the mass flow controller. Therefore, the flow rate of $N_2$ was adjusted to be approximate 10 ml/min equivalent to 5% of the flow rate range 200 ml/min of the mass flow controller 15.

After the end of the fabrication of the porous glass base materials, the inert gas ($N_2$) was caused to flow into each burner by changing the linear speed conditions (Conditions 1 to 8), and thereafter, the process for fabricating the porous glass base materials was repeatedly performed 10 times again.

As a result, under Conditions 1 to 6 where the linear speed was less than 25 m/s, no damage of the burner was observed, and the ten porous glass base materials were continuously fabricated. On the other hand, under Conditions 7 and 8, a damage was caused in the small-diameter port of the burner, and the number of fabricated base materials was less than 10. The fabricated porous glass base material was heated to 1500° C. in helium gas to be transformed into transparent glass, and thereafter the number of air bubbles equal to or larger than 0.5 mm in the transparent glass base material was visually counted. It is noted that the average number of air bubbles illustrated in Table 1 is the number of air bubbles per the volume of 1,000 cm$^3$ of a straight body portion of the transparent glass base material.

Under the conditions except for Condition 1 where the inert gas was not caused to flow, the average numbers of air bubbles were respectively lower than 10, which were satisfactory. Since the inert gas was caused to continuously flow into the burner for the period after the end of the fabrication to the start of the subsequent fabrication batch, the effect for avoiding the intrusion of the glass fine particle aggregate into the burner was confirmed.

TABLE 1

| | Linear speed (m/s) | Number of fabricated base materials | Number of base material cracks | Average number of air bubbles |
|---|---|---|---|---|
| Condition 1 | 0 | 10 | 0 | 13.87 |
| Condition 2 | 0.1 | 10 | 0 | 7.11 |
| Condition 3 | 0.5 | 10 | 0 | 1.36 |
| Condition 4 | 1.5 | 10 | 0 | 0.23 |
| Condition 5 | 14.5 | 10 | 0 | 0.15 |
| Condition 6 | 24.5 | 10 | 1 | 0.08 |
| Condition 7 | 40 | 7 | 3 | 0.07 |
| Condition 8 | 60 | 3 | 2 | 0.08 |

The number of cracks of the base materials in Table 1 corresponds to the number of cracks caused in the porous glass base materials immediately after the fabrication in response to the ejection of N$_2$ gas which is ejected from the burner after the end of the fabrication. A crack occurred in approximately half of the fabricated base materials under Conditions 7 and 8 where the linear speed was high. In addition, an extremely large number of air bubbles were generated under Condition 1 where the linear speed was low. Thus, the linear speed Ns of the inert gas ejected from the burner is preferably more than 0.5 m/s and less than 25 m/s, more preferably, equal to or more than 1.0 m/s and equal to or less than 15 m/s.

EXPLANATION OF REFERENCES 1 porous glass base material
2 deposit chamber
3 air supply opening
4 exhaust opening
5 core deposition burner
6 first clad deposition burner
7 second clad deposition burner
8 raw material gas ejection port
9 first seal gas ejection port
10 combustible gas ejection port
11 small-diameter combustion supporting gas ejection port
12 second seal gas ejection port
13 combustion supporting gas ejection port
14 inert gas flow rate controller
15 (raw material gas) mass flow controller
16 burner
17 inert gas supply valve
18 raw material gas supply valve

What is claimed is:

1. A fabrication method for a porous glass base material for optical fiber, comprising:
    supplying a glass raw material gas to a burner via a mass flow controller;
    generating glass fine particles in flame formed by ejecting the glass raw material gas and a combustible gas from the burner; and
    depositing the glass fine particles on a rotating starting material,
    wherein the burner continuously ejects inert gas having passed through the mass flow controller for at least a predetermined period immediately after an end of deposition of the glass fine particles,
    wherein the inert gas at 10% or less of a maximum value of a mass flow rate range is caused to continuously flow into the mass flow controller for at least the predetermined period immediately after the end of the deposition of the glass fine particles, and
    wherein an additional inert gas is introduced from downstream of the mass flow controller to control a linear speed of the inert gas at a burner outlet.

2. The fabrication method for the porous glass base material for optical fiber according to claim 1, wherein the inert gas is continuously ejected from the burner for a period from the end of the deposition of the glass fine particles to a start of a subsequent deposition.

3. The fabrication method for the porous glass base material for optical fiber according to claim 1, wherein a linear speed Ns of the inert gas ejected from the burner is more than 0.5 m/s and less than 25 m/s.

4. The fabrication method for the porous glass base material for optical fiber according to claim 3, wherein the linear speed Ns of the inert gas ejected from the burner is equal to or more than 1.0 m/s and equal to or less than 15 m/s.

5. The fabrication method for the porous glass base material for optical fiber according to claim 1, wherein the mass flow controller is fully opened to cause the inert gas to flow.

6. The fabrication method for the porous glass base material for optical fiber according to claim 1, wherein the glass raw material is SiCl$_4$ or GeCl$_4$.

7. The fabrication method for the porous glass base material for optical fiber according to claim 1, wherein the burner is a multi-nozzle burner.

8. The fabrication method for the porous glass base material for optical fiber according to claim 1, wherein the inert gas is at least any of helium, argon, and nitrogen.

9. The fabrication method for the porous glass base material for optical fiber according to claim 1, further comprising:
    before the supplying, heating the glass raw material gas to a retention temperature between 100° C. and 120° C., wherein
    the glass raw material gas supplied to the burner has passed through the mass flow controller that is maintained at the retention temperature.

10. The fabrication method for the porous glass base material for optical fiber according to claim 1, wherein the inert gas is introduced to the mass flow controller after being preheated to have a temperature higher than a boiling point of the glass raw material gas.

11. The fabrication method for the porous glass base material for optical fiber according to claim 1, wherein the inert gas has a temperature equal to or lower than a retention temperature of the mass flow controller.

* * * * *